(12) United States Patent
Kawaguchi

(10) Patent No.: US 8,169,544 B2
(45) Date of Patent: May 1, 2012

(54) IMAGE PROCESSING APPARATUS AND METHOD

(75) Inventor: Daisuke Kawaguchi, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 511 days.

(21) Appl. No.: 12/457,207

(22) Filed: Jun. 3, 2009

(65) Prior Publication Data

US 2010/0007677 A1      Jan. 14, 2010

(30) Foreign Application Priority Data

Jul. 8, 2008  (JP) ................. 2008-177561

(51) Int. Cl.
*H04N 9/74* (2006.01)

(52) U.S. Cl. ........ 348/581; 348/445; 348/555; 348/556; 348/558; 348/571; 348/565; 348/659; 348/687; 345/600; 345/660; 345/619; 345/472; 345/603; 345/604; 345/605; 382/298; 382/300

(58) Field of Classification Search .......... 348/581, 348/555, 445, 556, 558, 571, 565, 659, 687; 345/600, 660, 619, 472, 603, 604, 605; 382/298, 382/300
See application file for complete search history.

(56) References Cited

U.S. PATENT DOCUMENTS

| | | | |
|---|---|---|---|
| 5,313,303 A | 5/1994 | Ersoz et al. | |
| 5,519,447 A | 5/1996 | Shima et al. | |
| 5,734,434 A | 3/1998 | Kettenis | |
| 5,861,962 A * | 1/1999 | Maeda | 358/451 |
| 5,910,805 A * | 6/1999 | Hickey et al. | 345/467 |
| 6,317,164 B1 * | 11/2001 | Hrusecky et al. | 348/581 |
| 6,366,316 B1 * | 4/2002 | Parulski et al. | 348/239 |
| 6,975,755 B1 * | 12/2005 | Baumberg | 382/154 |

(Continued)

FOREIGN PATENT DOCUMENTS

EP    1 326 435 A2    7/2003

(Continued)

OTHER PUBLICATIONS

Intihar B: "Video-Conversion Techniques Ensure A Sharper Image", EDN Electrical Design News,Rogers Pub. Co. Englewood, Co. US. vol. 43 No. 6, Mar. 13, 1998, pp. 97-98, 100, 102, 104, 106. XP000869385.

(Continued)

*Primary Examiner* — Jefferey Harold
*Assistant Examiner* — Mustafizur Rahman
(74) *Attorney, Agent, or Firm* — McGinn IP Law Group, PLLC

(57) ABSTRACT

To eliminate a signal deviation that occurs when scaling processing is performed on image data including multiple signals having different data rates, there is provided an image processing apparatus which performs scaling processing on image data including multiple signals having different data rates and includes a first scaling processing unit that performs a first scaling processing according to a first scale factor in a first area; and a second scaling processing unit that performs a second scaling processing subsequent to the first scaling processing, according to a second scale factor in a second area adjacent to the first area, on a signal having a high data rate using the first scale factor, and performs the second scaling processing on a signal having a low data rate using the second scale factor obtained by correcting the first scale factor, after the first scaling processing.

14 Claims, 16 Drawing Sheets

U.S. PATENT DOCUMENTS

| | | | |
|---|---|---|---|
| 7,463,307 B2 * | 12/2008 | Cheng | 348/448 |
| 7,768,576 B2 * | 8/2010 | Yui et al. | 348/564 |
| 7,876,368 B2 * | 1/2011 | Craig et al. | 348/239 |
| 2003/0086026 A1 | 5/2003 | Kim | |
| 2003/0117526 A1 | 6/2003 | Kozai | |
| 2004/0012608 A1 * | 1/2004 | Jeon | 345/600 |
| 2004/0052432 A1 * | 3/2004 | Lee et al. | 382/298 |
| 2005/0207675 A1 * | 9/2005 | Fuchigami et al. | 382/298 |
| 2007/0124669 A1 * | 5/2007 | Makela | 715/520 |

FOREIGN PATENT DOCUMENTS

| | | |
|---|---|---|
| JP | 2003-189266 | 7/2003 |
| JP | 2007-60105 | 3/2007 |
| JP | 2007-74526 | 3/2007 |
| WO | WO 2005/096624 A1 | 10/2005 |

OTHER PUBLICATIONS

European Search Report dated Jan. 19, 2010.

* cited by examiner

| STEP | Y DATA | | | | | C DATA | | | | | CORRECTION VALUE |
|---|---|---|---|---|---|---|---|---|---|---|---|
| | Dst. Data No. | Resampling Point | Delta | Delta2 | Delta3 | Dst. Data No. | Resampling Point | Delta | Delta2 | Delta3 | Delta' |
| S51 | LS-2 | f | a | b | c | LS/2-1 | f/2 | a+b/2 | 2b+2c | 4c | -(1/2)b-c |
| S52 | LS-1 | f+a | a+b | b+c | c | | | | | | |
| S53 | LS | f+2a+b | a+2b+c | (b+2c) | (c) | LS/2 | f/2+a+b/2 | a+2b+c | (2b+6c) | (4c) | |
| S54 | LS+1 | f+3a+3b+c | a+2b+c | (b+2c) | (c) | | | | | | |
| S55 | LS+2 | f+4a+5b+2c | a+2b+c | (b+2c) | (c) | LS/2+1 | f/2+2a+5b/2+c | a+2b+c | (2b+6c) | (4c) | |

| CUBIC PROCESSING SECTION | LINEAR PROCESSING SECTION |

LS = LINEAR PROCESSING START
VALUES IN PARENTHESES ARE NOT USED FOR SUBSEQUENT DDA PROCESSING AND CAN ALSO BE REGARDED AS "0"

Fig. 5

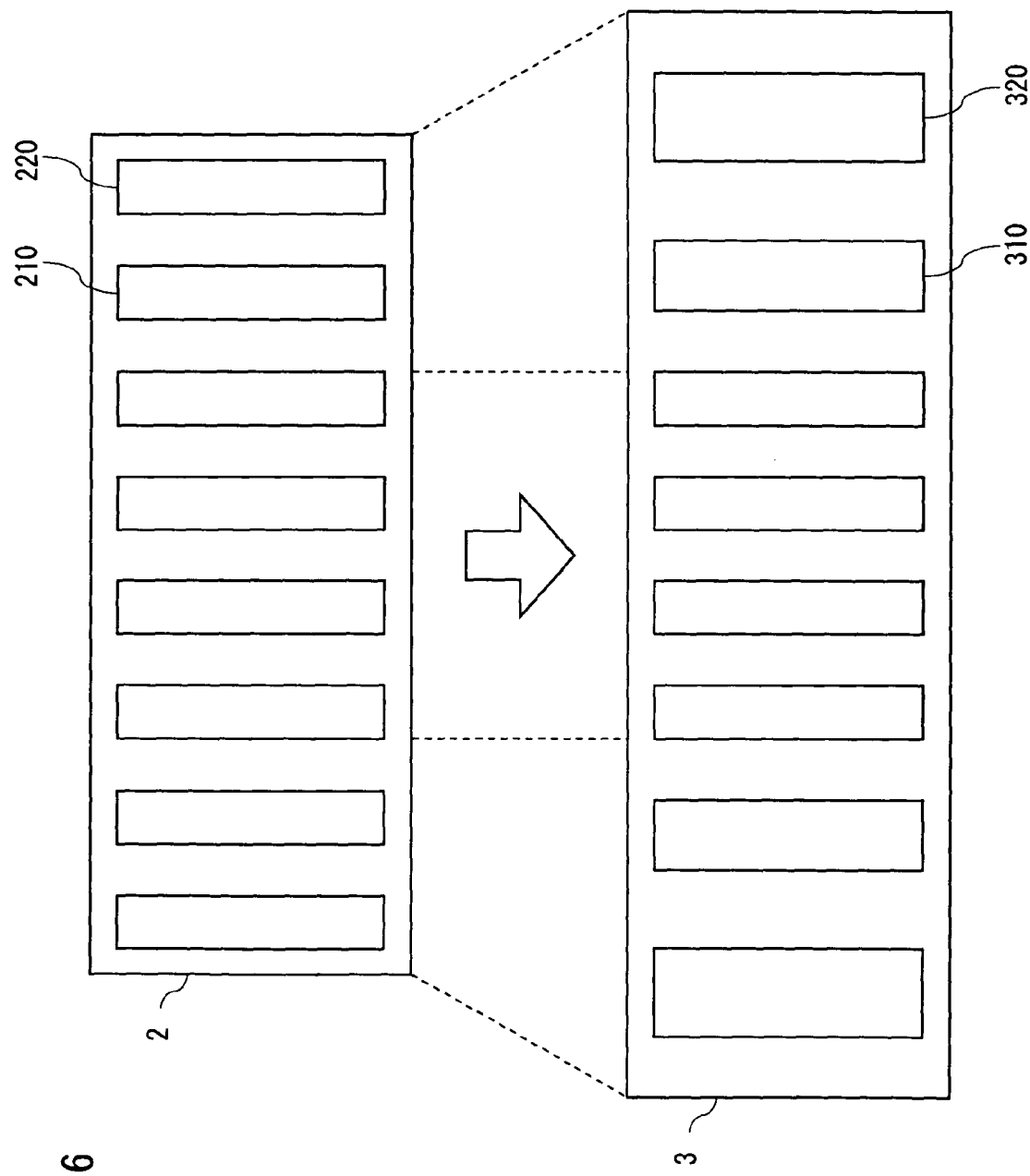

CS = CUBIC PROCESSING START
VALUES IN PARENTHESES ARE NOT USED FOR SUBSEQUENT DDA PROCESSING AND CAN ALSO BE REGARDED AS "0"

Fig. 8

| STEP | Y DATA | | | | C DATA | | | | CORRECTION VALUE |
|---|---|---|---|---|---|---|---|---|---|
| | Dst. Data No. | Resampling Point | Delta | Delta2 | Delta3 | Dst. Data No. | Resampling Point | Delta | Delta2 | Delta3 | Delta' |
| S81 | LS−2 | f | a | b | (c) | LS/2−1 | f/2 | a+b/2 | 2b | (4c) | −(1/2)b |
| S82 | LS−1 | f+a | a+b | b | (c) | | | | | | |
| S83 | LS | f+2a+b | a+2b | (b) | (c) | LS/2 | f/2+a+b/2 | a+2b | (2b) | (4c) | |
| S84 | LS+1 | f+3a+3b | a+2b | (b) | (c) | | | | | | |
| S85 | LS+2 | f+4a+5b | a+2b | (b) | (c) | LS/2+1 | f/2+2a+5b/2 | a+2b | (2b) | (4c) | |

QUADRATIC PROCESSING SECTION (S81, S82)
LINEAR PROCESSING SECTION (S83, S84, S85)

LS = LINEAR PROCESSING START
VALUES IN PARENTHESES ARE NOT USED FOR SUBSEQUENT DDA PROCESSING AND CAN ALSO BE REGARDED AS "0"

| BEFORE SWITCHING PROCESSING \ AFTER SWITCHING PROCESSING | LINEAR PROCESSING | QUADRATIC PROCESSING | CUBIC PROCESSING |
|---|---|---|---|
| LINEAR PROCESSING | - | Delta : $\frac{1}{2}\beta_2$ | Delta : $\frac{1}{2}\beta$ |
| QUADRATIC PROCESSING | Delta : $-\frac{1}{2}\beta_2$ | - | Delta2 : $2\gamma$ |
| CUBIC PROCESSING | Delta : $-\frac{1}{4}d2_c(n-1)-\frac{1}{2}\gamma$ | Delta2 : $-2\gamma$ | - |

| STEP | Y DATA | | | | | C DATA | | | | |
|------|--------|--|--|--|--|--------|--|--|--|--|
| | Dst. Data No. | Resampling Point | Delta | Delta2 | Delta3 | Dst. Data No. | Resampling Point | Delta | Delta2 | Delta3 |
| S151 | LS−2 | f | a | b | c | LS/2−1 | f/2 | a+b/2 | 2b+2c | 4c |
| S152 | LS−1 | f+a | a+b | b+C | c | | | | | |
| S153 | LS | f+2a+b | a+2b+c | (b+2c) | (c) | LS/2 | f/2+a+b/2 | a+5b/2+ 2c | (2b+6c) | (4c) |
| S154 | LS+1 | f+3a+3b+c | a+2b+c | (b+2c) | (c) | | | | | |
| S155 | LS+2 | f+4a+5b+2c | a+2b+c | (b+2c) | (c) | LS/2+1 | f/2+2a+3b+ 2c | a+5b/2+ 2c | (2b+6c) | (4c) |

CUBIC PROCESSING SECTION: S151, S152
LINEAR PROCESSING SECTION: S153, S154, S155

LS = Linear Processing Start
VALUES IN PARENTHESES ARE NOT USED FOR SUBSEQUENT DDA PROCESSING AND CAN ALSO BE REGARDED AS "0"

IMAGE PROCESSING APPARATUS AND METHOD

BACKGROUND

1. Field of the Invention

The present invention relates to an image processing apparatus and method, and more particularly, to an image processing apparatus and method for performing scaling processing on image data including a plurality of signals having different data rates.

2. Description of Related Art

In recent years, there is a need for a technique to convert an aspect ratio of image data in the field of image processing. For example, image data which is included in television video data and distributed with an aspect ratio of 4:3 is converted into image data with an aspect ratio of 16:9 or the like by performing scaling processing.

Japanese Unexamined Patent Application Publication No. 2003-189266 discloses an image processing apparatus capable of performing a continuous, more natural enlargement process on the entire display screen. The image processing apparatus disclosed in Japanese Unexamined Patent Application Publication No. 2003-189266 includes a DDA (Digital Differential Analyzer) operation unit that allows a central portion of a single image to be enlarged linearly and allows both end portions thereof to be enlarged non-linearly, when video data having the aspect ratio of 4:3 is enlarged in the horizontal direction for a video display apparatus having the aspect ratio of 16:9. In particular, the image processing apparatus disclosed in Japanese Unexamined Patent Application Publication No. 2003-189266 controls each resampling point of a source image with the use of the DDA operation unit so as to generate pixel data of a destination image.

FIG. 10 is a block diagram showing the configuration of the image processing apparatus disclosed in Japanese Unexamined Patent Application Publication No. 2003-189266. An image conversion unit 90 included in an image processing apparatus 9 includes a memory unit 91, a resampling unit 92, and a DDA operation unit 93. The memory unit 91 stores source image data to be subjected to scaling processing. The DDA operation unit 93 calculates the resampling point, which is a position at which the source image data is acquired, based on the position of destination image data. In this case, the DDA operation unit 93 calculates the resampling point by linear function processing, quadric function processing, and cubic function processing by using the previous resampling point and an increment thereof, and then outputs the calculated resampling point to the memory unit 91 and the resampling unit 92. The resampling unit 92 acquires image data corresponding to the resampling point, from the memory unit 91 to perform the scaling processing on the acquired image data, and then outputs the destination image data.

In this case, Delta represents an increment of a resampling point. In the linear scaling, Delta is a constant value and is also a reciprocal of an enlargement ratio. Further, an increment of Delta is defined as Delta2 and an increment of Delta2 is defined as Delta3, thereby enabling shifting of the resampling point in a cubic function manner. Furthermore, in order to achieve non-linear scaling in the both end portions, the area of the destination image is divided into three areas. Then, linear scaling is performed on the central portion by shifting the resampling point in a linear function manner, and non-linear scaling is performed on the both end portions by shifting the resampling point in a cubic function manner.

FIG. 11 is a flowchart showing processing for calculating the resampling point according to Japanese Unexamined Patent Application Publication No. 2003-189266. First, the DDA operation unit 93 initializes parameters (S901). Herein, "DstWidth" represents a processing end position of the destination image data. Additionally, "LinearStart" represents a position of the destination image data at which the linear scaling is started, and "LinearEnd" represents a position of the destination image data at which the linear scaling is finished. "OutCount" represents a current position of the destination image data to be processed.

Next, the DDA operation unit 93 determines whether OutCount is less than "DstWidth" (S902). When determining that OutCount is equal to or greater than "DstWidth", the DDA operation unit 93 finishes the processing. When determining that OutCount is less than "DstWidth", the DDA operation unit 93 adds Delta to "ResamplingPoint" (S903).

Then, the DDA operation unit 93 determines whether OutCount corresponds to the both end portions (S904). When determining that OutCount corresponds to the both end portions, the DDA operation unit 93 adds Delta2 to Delta and also adds Delta3 to Delta2 (S905). When determining that OutCount does not correspond to the both end portions, that is, determining that OutCount corresponds to the central portion, the DDA operation unit 93 determines whether OutCount is equal to "LinearStart" (S906). When determining that OutCount is equal to "LinearStart", the DDA operation unit 93 inverts the sign of Delta2 (S907). When determining that OutCount is other than "LinearStart", the DDA operation unit 93 adds "1" to OutCount (S908) after the processing of Steps S905 and S907. After that, the process returns to Step S902.

Assuming herein that the pixel number of the destination image is represented by x (x=0, 1, 2, . . . ) and the resampling point obtained at the time is represented by f(x), $d_1(x)$ serving as Delta in the pixel number x can be expressed by the following relational expression (1).

$$d_1(x)=f(x+1)-f(x) \qquad (1)$$

Further, $d_2(x)$ serving as Delta2 in the pixel number x can be expressed by the following relational expression (2).

$$d_2(x)=d_1(x+1)-d_1(x) \qquad (2)$$

Furthermore, $d_3(x)$ serving as Delta3 in the pixel number x can be expressed by the following relational expression (3).

$$d_3(x)=d_2(x+1)-d_2(x)=\text{constant} \qquad (3)$$

The relational expressions (1), (2), and (3) are given as shown in FIGS. 12A to 12C. Herein, f(x) represents a cubic expression of x in a non-linear section, that is, a cubic processing section, and also represents a linear expression of x in a linear section, that is, a linear processing section.

FIGS. 12A to 12C are graphs each showing changes in DDA operands corresponding to output pixels in Japanese Unexamined Patent Application Publication No. 2003-189266. FIG. 12A is a graph showing changes in resampling point. FIG. 12B is a graph showing changes in Delta. FIG. 12C is a graph showing changes in Delta2.

Japanese Unexamined Patent Application Publication Nos. 2007-60105 and 2007-74526 are disclosed as related art. Japanese Unexamined Patent Application Publication No. 2007-60105 discloses an image data conversion apparatus that converts source image data having an original aspect ratio into data having an output aspect ratio. The image data conversion apparatus disclosed in Japanese Unexamined Patent Application Publication No. 2007-60105 includes parameter generation means for varying parameters for conversion according to the output aspect ratio.

Japanese Unexamined Patent Application Publication No. 2007-74526 discloses an image processing apparatus to solve a problem of a loss of a color-difference signal, upon combining a plurality of image data items given by a component signal including a luminance signal and two color-difference signals at a data rate of 4:2:2. The image processing apparatus disclosed in Japanese Unexamined Patent Application Publication No. 2007-74526 converts the component signal having the data rate of 4:2:2 into a component signal having a data rate of 4:4:4, and generates a composite video signal so that an image is displayed by giving priority to a component signal of an image of a higher priority in accordance with a predetermined priority order.

SUMMARY

The present inventor has found a problem that, when the technology disclosed in Japanese Unexamined Patent Application Publication No. 2003-189266 is applied to image data that includes multiple types of signals including a luminance signal and color-difference signals with different data rates, a deviation occurs between signals of the image data after scaling processing.

For example, YCbCr 4:2:2 format is used as a standard format for video data including a luminance signal represented by Y data and two color-difference signals represented by Cb and Cr data (hereinafter, collectively referred to as "C data") at a data rate of 4:2:2. To apply the technology disclosed in Japanese Unexamined Patent Application Publication No. 2003-189266 to image data in the YCbCr 4:2:2 format, it is necessary to perform scaling processing separately and independently for each type of signals, and then perform processing for combining image data after the scaling processing.

FIG. 13 is a block diagram showing a configuration example of an apparatus for performing scaling processing by applying the technology disclosed in Japanese Unexamined Patent Application Publication No. 2003-189266 to the image data in the YCbCr 4:2:2 format. An image processing apparatus 9a shown in FIG. 13 is a modified example of the image processing apparatus 9 disclosed in Japanese Unexamined Patent Application Publication No. 2003-189266, and includes an image conversion unit 90a and an image conversion unit 90b. The image conversion unit 90a receives an input of Y data 71, which is included in source image data 7, to perform scaling processing on the received data, and outputs Y data 81 as destination image data 8. Further, the image conversion unit 90b receives an input of C data 72, which is included in the source image data 7, to perform scaling processing on the received data, and outputs C data 82 as the destination image data 8.

After that, the Y data 81 is combined with the C data 82 to generate the destination image data 8. The results thus obtained are shown in FIG. 14 as a schematic diagram. It is assumed in FIG. 14 that the source image data 7 includes a colored area 710 and a colored area 720. The colored area 710 and the colored area 720 are represented by Y data and C data, respectively. Further, the destination image data 8, which is data obtained after the scaling processing performed by the image processing apparatus 9a, includes a colored area 810 and a colored area 820. Note that the colored area 810 includes color shift areas 811 which are provided at both ends thereof and in which a significant signal deviation occurs. Further, the colored area 820 includes a color shift area 821 and a color shift area 822 which are provided at both ends thereof.

The above-mentioned results are obtained because the resampling position of the C data corresponding to the Y data is not properly set at a timing of switching the order of the DDA operation. The timing of switching the order of the DDA operation refers to, for example, a timing when a function for performing the DDA operation is switched from a cubic function to a linear function. For example, upon switching from the linear scaling to the non-linear scaling, the results of the DDA operation with the linear function are used as input data for the DDA operation with the cubic function. Meanwhile, the C data has a data rate less than that of the Y data (½), and thus the data positions serving as inputs do not correspond to each other. As a result, a color shift occurs when the scaling processing is carried out.

Further, the technology disclosed in Japanese Unexamined Patent Application Publication No. 2007-60105 is capable of selecting or adjusting parameters for conversion according to an aspect ratio of a conversion destination. In the technology, however, an image format for expressing a single image information item using multiple types of signals having different rates is not considered, and therefore such an image format cannot be handled.

Meanwhile, the technology disclosed in Japanese Unexamined Patent Application Publication No. 2007-74526 processes an image format such as the YCbCr 4:2:2 format, but the processing is carried out after the C data portion is doubled in advance. As a result, the amount of the C data is twice as large as the source data, and a large number of memories are required, which leads to an increase in circuit size.

A first exemplary aspect of an embodiment of the present invention is an image processing apparatus that performs scaling processing on image data including a plurality of signals having different data rates, including: a first scaling processing unit that performs a first scaling processing according to a first scale factor in a first area; and a second scaling processing unit that performs a second scaling processing subsequent to the first scaling processing, according to a second scale factor in a second area adjacent to the first area. The second scaling processing unit performs the second scaling processing on a signal having a high data rate with use of the first scale factor, upon start of the second scaling processing, and performs the second scaling processing on a signal having a low data rate with use of the second scale factor obtained by correcting the first scale factor.

A second exemplary aspect of an embodiment of the present invention is an image processing method that performs scaling processing on image data including a plurality of signals having different data rates, the image processing method including: a first scaling processing step of performing a first scaling processing according to a first scale factor in a first area; and a second scaling processing step of performing a second scaling processing subsequent to the first scaling processing, according to a second scale factor in a second area adjacent to the first area. The second scaling processing step includes performing the second scaling processing on a signal having a high data rate with use of the first scale factor, upon start of the second scaling processing, and performing the second scaling processing on a signal having a low data rate with use of the second scale factor obtained by correcting the first scale factor.

According to the image processing apparatus and method of exemplary aspects of the present invention, the second scaling processing unit performs the second scaling processing on the signal having a low data rate according to the second scale factor which is obtained by correcting the first scale factor, unlike in the case of the signal having a high data rate, thereby enabling adjustment of the results of the second scaling processing. Consequently, a deviation between a signal having a high data rate and a signal having a low data rate, which is caused as a result of the scaling processing, can be eliminated.

According to an exemplary embodiment of the present invention, it is possible to eliminate a signal deviation that occurs when scaling processing is performed on image data including a plurality of signals having different data rates.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 5 is a diagram showing an algorithm and changes in values upon switching from cubic processing to linear processing in the first example of the present invention;

FIG. 6 is a schematic diagram showing an outline of the results of scaling processing for image data in the first example of the present invention;

FIG. 8 is a diagram showing an algorithm and changes in values upon switching from quadratic processing to linear processing in a third example of the present invention;

FIG. 9 is a table showing correction values at the time when linear processing, quadratic processing, and cubic processing are mutually switched according to an exemplary embodiment of the present invention;

FIG. 15 is a diagram showing an algorithm and changes in values upon switching from cubic processing to linear processing in the related art.

DETAILED DESCRIPTION OF THE EXEMPLARY EMBODIMENTS

Figure 1:
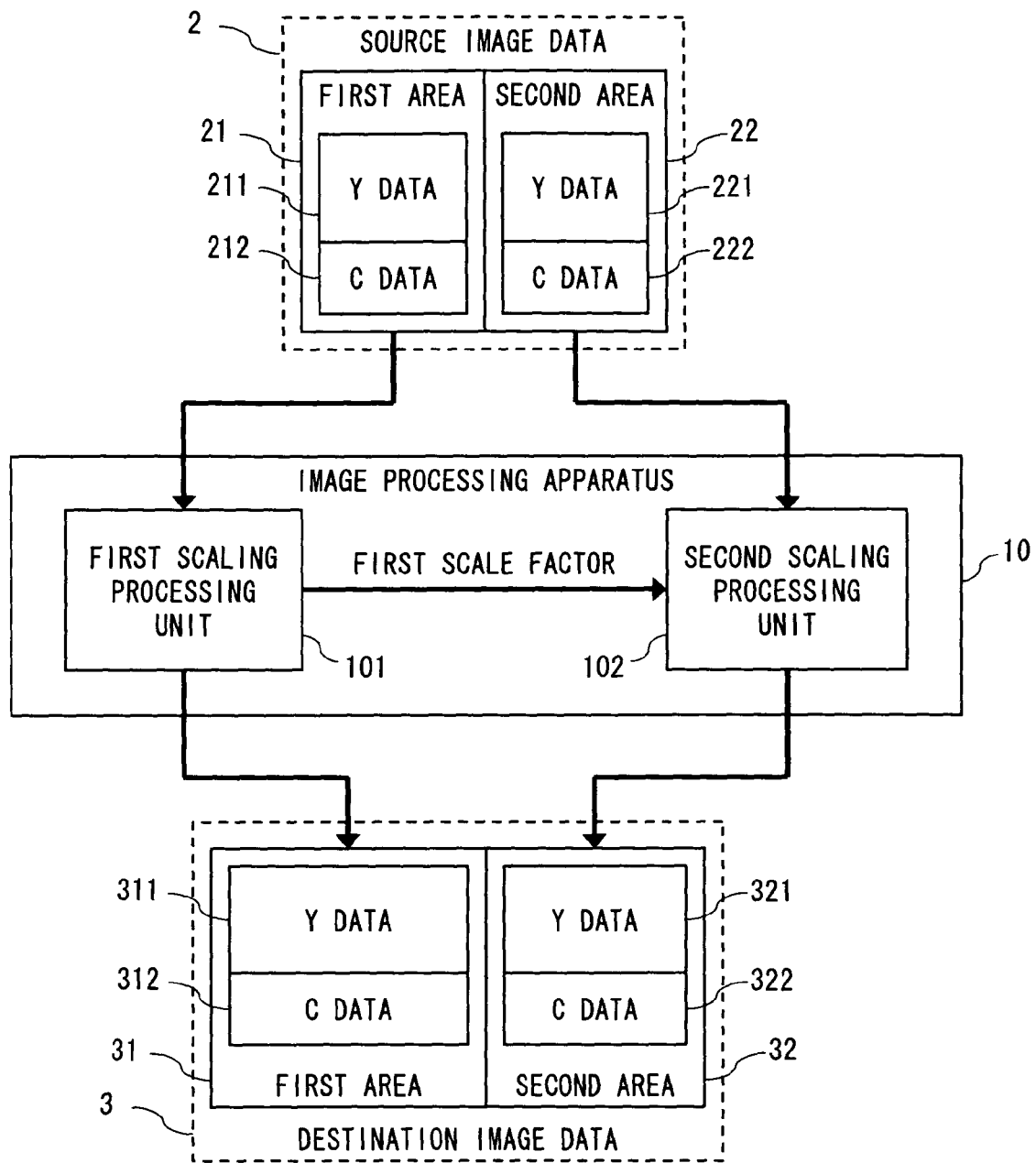
FIG. 1 is a block diagram showing the configuration of an image processing apparatus according to a first exemplary embodiment of the present invention.

Specific exemplary embodiments to which the present invention is applied will be described in detail below with reference to the drawings. The identical components are denoted by the same reference symbols throughout the drawings, and the redundant explanation thereof is omitted as appropriate for clarification of the explanation.

First, the cause of the problem inherent in Japanese Unexamined Patent Application Publication No. 2003-189266 is analyzed to make clear the reason why the present inventor has conceived the present invention.

First of all, in the YCbCr 4:2:2 format of image data in which the problem occurs, the data amount in the horizontal direction of Y data representing a luminance signal differs from that of C data representing a color-difference signal. In this regard, the following two definitions are provided for the purpose of explanation. The Y data corresponding to n-th data of the C data is defined as 2n-th data of the Y data (Definition 1). A resampling point of the Y data corresponding to an n-th resampling point of the C data is defined as a 2n-th resampling point of the Y data (Definition 2). Note that the resampling point of the C data is a position (point) of the C data with respect to the source image data. Further, the number of resampling points corresponds to the data amount of a destination image. The destination image is also generated in the YCbCr 4:2:2 format, and therefore the resampling point of the destination image is defined in a similar manner as Definition 1.

Further, the following definition is made based on Definitions 1 and 2. When the resampling point of the C data corresponds to ½ of the resampling point of the Y data, "the resampling position of the Y data matches the resampling position of the C data" (Definition 3).

It is assumed herein that, regarding the Y data, an initial value of Delta is represented by "α"; an initial value of Delta2 is represented by "β"; Delta3 is represented by "γ"; and an initial value of a resampling point is represented by "I". It is also assumed that Delta3 is a constant value. Based on recurrence formulae for the relational expressions (1) to (3) and Definitions 1 and 2, a resampling point fy(x) of the Y data can be expressed by the following relational expression (4).

$$f_y(x) = \frac{1}{6}\gamma x^2 + \frac{1}{2}(\beta - \gamma)x^2 + \frac{1}{6}(6\alpha - 3\beta + 2\gamma)x + I \quad (4)$$

$$(0 \le x < Dst \cdot \text{Width})$$

Further, a resampling point fc(x) of the C data can be expressed by the following relational expression (5).

$$f_c(x) = \frac{2}{3}\gamma x^3 + (\beta - \gamma)x^2 + \frac{1}{6}(6\alpha - 3\beta + 2\gamma)x + \frac{1}{2}I \quad (5)$$

$$(0 \le x < Dst \cdot \text{Width}/2)$$

Furthermore, Delta, Delta2, and Delta3, which are increments of the resampling point, can be derived from the relational expressions (1) to (5). Additionally, d1y(x) that represents Delta of the Y data can be expressed by a relational expression (6); d2y(x) that represents Delta2 of the Y data can be expressed by a relational expression (7); and d3y(x) that represents Delta3 of the Y data can be expressed by a relational expression (8).

$$d1_y(x) = \frac{1}{2}\gamma x^2 + \frac{1}{2}(2\beta - \gamma)x + \alpha \qquad (6)$$

$$d2_y(x) = \gamma x + \beta \qquad (7)$$

$$d3_y(x) = \gamma \qquad (8)$$

Further, d1c(x) that represents Delta of the C data can be expressed by a relational expression (9); d2c(x) that represents Delta2 of the C data can be expressed by a relational expression (10); and d3x(x) that represents Delta3 of the C data can be expressed by a relational expression (11).

$$d1_c(x) = 2\gamma x^2 + 2\beta x + \alpha + \frac{\beta}{2} \qquad (9)$$

$$d2_c(x) = 4\gamma x + 2\beta + 2\gamma \qquad (10)$$

$$d3_C(x) = 4\gamma \qquad (11)$$

Then, when the number of resampling points of the C data is represented by "n", the DDA operand of the resampling point of the corresponding Y data is compared with the DDA operand of the resampling point of the C data. The DDA operands of the Y data can be expressed by the following relational expressions (12) to (15).

$$f_y(2n) = \frac{4}{3}\gamma n^3 + 2(\beta - \gamma)n^2 + \frac{1}{3}(6\alpha - 3\beta + 2\gamma)n + I \qquad (12)$$

$$d1_y(2n) = 2\gamma n^2 + (2\beta - \gamma)n + \alpha \qquad (13)$$

$$d2_y(2n) = 2\gamma n + \beta \qquad (14)$$

$$d3_y(2n) = \gamma \qquad (15)$$

Further, the DDA operands of the C data can be expressed by the following relational expressions (16) to (19).

$$f_c(n) = \frac{2}{3}\gamma n^3 + (\beta - \gamma)n^2 + \frac{1}{6}(6\alpha - 3\beta + 2\gamma)n + \frac{1}{2}I \qquad (16)$$

$$d1_c(n) = 2\gamma n^2 + 2\beta n + \alpha + \frac{\beta}{2} \qquad (17)$$

$$d2_c(n) = 4\gamma n + 2\beta + 2\gamma \qquad (18)$$

$$d3_C(n) = 4\gamma \qquad (19)$$

Herein, the relational expressions (12) and (16) satisfy the relationship of the following relational expression (20). Accordingly, it can be said that the resampling positions of the Y data and C data are always the same.

$$f_c(n) = \frac{1}{2}f_y(2n) \ (0 \le n < Dst.\ Width/2) \qquad (20)$$

Additionally, the relational expressions for Delta, Delta2, and Delta3 can be expressed by the following relational expressions (21), (22), and (23). Note that the derivation of the following relational expressions can be proved by induction, but the proof is omitted herein.

$$d1_c(n) = d1_y(2n) + \frac{1}{2}d2_y(2n) \qquad (21)$$

$$d2_c(n) = 2 \cdot d2_y(2n) + 2\gamma \qquad (22)$$

$$d3_c(n) = 4\gamma \qquad (23)$$

The relational expressions (4) to (23) can be applied as quadric function processing assuming $\gamma = 0$, and can also be applied as linear function processing assuming $\beta = 0$ and $\gamma = 0$.

In this case, the DDA operands used during quadric function processing are validated by actually substituting the operands into the relational expressions (12) to (14) and the relational expressions (16) to (18), assuming $\gamma = 0$. It is assumed herein that $I_2$, $\alpha_2$, and $\beta_2$ are values of the resampling point, Delta, and Delta2, respectively, upon start of the quadratic processing. The DDA operands of the Y data used during quadric function processing can be expressed by the following relational expressions (24) to (26).

$$f_y(2n) = 2\beta_2 n^2 + (2\alpha_2 - \beta_2)n + I_2 \qquad (24)$$

$$d1_y(2n) = 2\beta_2 n + \alpha_2 \qquad (25)$$

$$d2_y(2n) = \beta_2 \qquad (26)$$

Further, the DDA operands of the C data used during quadric function processing can be expressed by the following relational expressions (27) to (29).

$$f_c(n) = \beta_2 n^2 + \frac{1}{2}(2\alpha_2 - \beta_2)n + \frac{1}{2}I_2 \qquad (27)$$

$$d1_c(n) = 2\beta_2 n + \alpha_2 + \frac{\beta_2}{2} \qquad (28)$$

$$d2_c(n) = 2\beta_2 \qquad (29)$$

When relational expressions for the Y data and C data are derived from the above expressions, the relational expressions for the Y data and C data used during quadratic processing can be expressed by the following relational expressions (30) to (32).

$$f_c(n) = \frac{1}{2}f_y(2n) \qquad (30)$$

$$d1_c(n) = d1_y(2n) + \frac{1}{2}d2_y(2n) = d1_y(2n) + \frac{\beta_2}{2} \qquad (31)$$

$$d2_c(n) = 2 \cdot d2_y(n) = 2\beta_2 \qquad (32)$$

From the relational expression (30), it can be said that the resampling positions of the Y data and C data are always the same.

Additionally, the DDA operands used during linear function processing are validated assuming $\beta = 0$ and $\gamma = 0$. It is assumed herein that $I_1$ and $\alpha_1$ are values of the resampling point and Delta, respectively, at the time of starting the linear processing. The DDA operands of the Y data used during linear function processing can be expressed by the following relational expressions (33) and (34).

$$f_y(2n) = 2\alpha_1 n + I_1 \qquad (33)$$

$$d1_y(2n) = \alpha_1 \qquad (34)$$

Further, the DDA operands of the C data used during linear function processing can be expressed by the following relational expressions (35) and (36).

$$f_c(n) = \alpha_1 n + \frac{1}{2} l_1 \quad (35)$$

$$d1_c(n) = \alpha_1 \quad (36)$$

When relational expressions for the Y data and C data are derived from the above expressions, the relational expressions for the Y data and D data used during linear processing can be expressed by the following relational expressions (37) and (38).

$$f_c(n) = \frac{1}{2} f_y(2n) \quad (37)$$

$$d1_c(n) = d1_y(2n) = \alpha_1 \quad (38)$$

From the relational expression (37), it can be said that the resampling positions of the Y data and C data are always the same.

In view of the foregoing, the above-mentioned problem that occurs in Japanese Unexamined Patent Application Publication No. 2003-189266 is exemplified. FIG. 15 is a diagram showing an algorithm and changes in values upon switching from the cubic processing to the linear processing in Japanese Unexamined Patent Application Publication No. 2003-189266. In FIG. 15, "Dst. Data No." of each of the Y data and C data represents the position of the destination image data, that is, the number of resampling points. Additionally, "LS" of "Dst. Data No." represents the number of resampling points at the time of starting the linear processing for the Y data. FIG. 15 shows a case where the DDA processing is carried out when "Dst. Data No." is in a range from "LS−2" to "LS+2". Though FIG. 15 shows that the Y data and C data are arranged side by side for ease of comparison, the Y data and C data may be processed independently of each other.

Herein, "Dst. Data No." defines the DDA operand of the C data with the DDA operand in "LS−2", which is two steps before "LS" with respect to the Y data, as a reference. In other words, the DDA operands of the C data can be calculated by the relational expressions (20) to (23).

Specifically, when "Dst. Data No." of the Y data indicates "LS−2" in Step S151 of FIG. 15, the resampling point is defined as "f"; Delta is defined as "a"; Delta2 is defined as "b"; and Delta3 is defined as "c". Further, when "Dst. Data No." of the C data indicates "LS/2−1", the resampling point is defined as "f/2"; Delta is defined as "a+b/2"; Delta2 is defined as "2b+2c"; and Delta3 is defined as "4c".

The processing flow is described below. First, in Step S151, "Dst. Data No." of the Y data indicates "LS−2", and the DDA operation unit 93 adds Delta to the resampling point by the processing corresponding to Step S903 of FIG. 11. Further, since "LS−2" corresponds to the cubic processing section, the DDA operation unit 93 determines "YES" in Step S904 of FIG. 11, and adds Delta2 to Delta and also adds Delta3 to Delta2 by the processing corresponding to Step S905 of FIG. 11. Furthermore, "Dst. Data No." of the C data indicates "LS/2−1", and the DDA operation unit 93 performs addition of the resampling point, Delta, and Delta2 in a similar manner as in the Y data. Note that Delta3 of each of the Y data and C data is constant.

Next, in Step S152, "Dst. Data No." of the Y data indicates "LS−1", and the DDA operation unit 93 performs addition of the resampling point, Delta, and Delta2 in a similar manner as in Step S151. Since C data corresponding to Y data does not exist in this case, processing for the C data is not carried out. At this time, the DDA operation unit 93 performs cubic processing for the Y data and C data, and uses the results of the cubic processing as input values for the subsequent step.

Then, in Step S153, "Dst. Data No." of the Y data indicates "LS", and the DDA operation unit 93 adds Delta to the resampling point by the processing corresponding to Step S903 of FIG. 11. Further, since "LS" corresponds to the linear processing section, the DDA operation unit 93 determines "NO" in Step S904 of FIG. 11, and does not perform addition of Delta and Delta2. Furthermore, "Dst. Data No." of the C data indicates "LS/2", and the DDA operation unit 93 performs addition of the resampling point in a similar manner as in the Y data. Note that Delta of each of the Y data and C data is constant.

After that, in Step S154, "Dst. Data No." of the Y data indicates "LS+1", and the DDA operation unit 93 performs addition of the resampling point in a similar manner as in Step S153. Since C data corresponding to Y data does not exist in this case, processing for the C data is not carried out. Also in the steps subsequent to Step S155, Steps S153 and S154 are repeatedly executed.

Herein, the resampling point of the Y data is compared with the resampling point of the C data used during starting the processing of Step S155. The resampling point of the Y data is represented by f+4a+5b+2c. Further, the resampling point of the C data is represented by f/2+2a+3b+2c. Accordingly, fc(n)=1/2fy(2n) of the relational expression (20) is not satisfied, and therefore it can be said that the resampling positions are not the same. That is, in the destination image, the C data representing color difference information does not correspond to the Y data representing luminance information, which causes a color shift. In other words, this indicates that a significant signal deviation occurs, and also indicates that the color shift increases if the processing subsequent to Step S155 is continued.

Further, in Step S153, no color shift occurs, and it is obvious that the color shift first occurs in Step S155. In other words, this indicates that the value of Delta for use in calculating the resampling point, which is the input value in Step S155, is not correct. The sentence "the value of Delta is not correct" means that the relational expressions which should be satisfied by the Y data and C data are not satisfied. Specifically, Delta needs to satisfy the relational expression (38) when the linear processing is carried out, while Delta does not satisfy the relational expression (38) when "Dst. Data No." indicates "LS" or subsequent numbers.

In view of the foregoing, it can be said that the color shift occurs because each DDA operand at the boundary where the order of the processing is switched has two sides: a value obtained as a result of processing of the previous operation; and a value serving as an operand for the subsequent processing. Accordingly, immediately before the order of the processing of the DDA operation is switched, the relational expressions for the Y data and C data, which should be satisfied by the order of the previous procession, are satisfied as the operation result of the previous processing. Meanwhile, immediately after the order of the processing is switched, the relational expressions for the Y data and C data, which should be satisfied by Delta, are not satisfied.

Specifically, in the case of FIG. 15, the operation results of Steps S151 and S152 show that the DDA operands of the Y data and C data satisfy all the relational expressions (20) to

(23) as a result of the cubic processing, and are used as input values in Step S153. Meanwhile, the operands serving as the input values in Step S155 do not satisfy all the relational expressions (37) and (38) that should be satisfied. This causes the color shift after the linear processing, and the color shift gradually increases due to the accumulation of the color shift. For this reason, the present inventor has conceived the present invention to correct operands at a boundary where the order of processing is switched as described below.

[First Exemplary Embodiment]

FIG. 1 is a block diagram showing the configuration of an image processing apparatus 10 according to a first exemplary embodiment of the present invention. The image processing apparatus 10 receives source image data 2 to perform scaling processing including enlargement and reduction processing according to a predetermined scale factor with the use of a first scaling processing unit 101 and a second scaling processing unit 102, and outputs destination image data 3.

In this case, the source image data 2 includes a first area 21 and a second area 22 which is adjacent to the first area 21. The first area 21 includes Y data 211 and C data 212 which are a plurality of different signals. Herein, the Y data 211 has a data rate greater than that of the C data 212. The second area 22 includes Y data 221 and C data 222 which are a plurality of different signals. The data rates of the Y data 221 and the C data 222 are equal to the data rates of the Y data 211 and the C data 212.

Further, the destination image data 3 includes a first area 31 and a second area 32 which correspond to the first area 21 and the second area 22, respectively. The first area 31 includes Y data 311 and C data 312 which correspond to the Y data 211 and the C data 212, respectively, and have data rates similar to the data rates of the Y data 211 and C data 212. The second area 32 includes Y data 321 and C data 322 which correspond to the Y data 221 and the C data 222, respectively, and have data rates similar to the data rates of the Y data 221 and C data 222.

The first scaling processing unit 101 processes the Y data 211 and C data 212 that are included in the first area 21. The first scaling processing unit 101 performs scaling processing on the Y data 211 according to a first scale factor, and generates and outputs the Y data 311. Further, the first scaling processing unit 101 performs scaling processing also on the C data 212 according to the first scale factor, and generates and outputs the C data 312. Then, the first scaling processing unit 101 corrects the first scale factor, and outputs the first scale factor and the corrected first scale factor to the second scaling processing unit 102.

The second scaling processing unit 102 processes the Y data 221 and C data 222 which are processed after the processing performed by the first scaling processing unit 101 and are included in the second area 22. The second scaling processing unit 102 calculates a second scale factor for the Y data 221 with the use of the first scale factor, and performs scaling processing on the Y data 221 according to the second scale factor. Thus, the scaling processing unit 102 generates and outputs the Y data 321. Further, the second scaling processing unit 102 calculates the corrected second scale factor for the C data 222 with the use of the corrected first scale factor, and performs scaling processing on the C data 222 according to the corrected second scale factor. Thus, the second scaling processing unit 102 generates and outputs the C data 322.

Note that the second scaling processing unit 102 may correct the first scale factor immediately before or simultaneously with the scaling processing.

Alternatively, the resampling point of the source image data 2 may be calculated by the above-mentioned scaling processing.

According to the first exemplary embodiment of the present invention, in the image data including a plurality of signals having different data rates, such as the Y data 211, Y data 221, C data 212, and C data 222 included in the source image data 2, the use of the corrected second scale factor for the C data 22, which is included in the second area 22 and has a low data rate, enables the scaling processing different from that for the C data 212 included in the first area 21. As a result, a color shift that occurs when the scaling processing is carried out, that is, a signal deviation can be eliminated.

In other words, the first scaling processing unit according to the first exemplary embodiment of the present invention calculates the second scale factor for a signal having a low data rate by correcting the first scale factor so that the second scale factor becomes a value obtained by performing the second scaling processing on the first scale factor.

Note that the image data in which the above-mentioned problem occurs includes a plurality of signals having different data rates. Specifically, a signal having a high data rate may be a luminance signal, and a signal having a low data rate may be a color-difference signal indicating the difference in color from the luminance signal. More specifically, the luminance signal may be the Y data, and the color-difference signal may be the C data represented by "Cb" and "Cr". In other words, in the YCbCr 4:2:2 format, the data amount in the horizontal direction of the Y data is different from that of the C data. Note that image formats used in exemplary embodiments of the present invention are not limited to the YCbCr 4:2:2 format.

EXAMPLE 1

As a first example of the image processing apparatus 10 according to the first exemplary embodiment of the present invention, an image processing apparatus 10a that performs scaling processing on image data in the YCbCr 4:2:2 format will be described below by way of example. In the first example, a description is given of a case where the DDA operand is corrected when the scaling processing is switched from the cubic processing to the linear processing.

Figure 2:
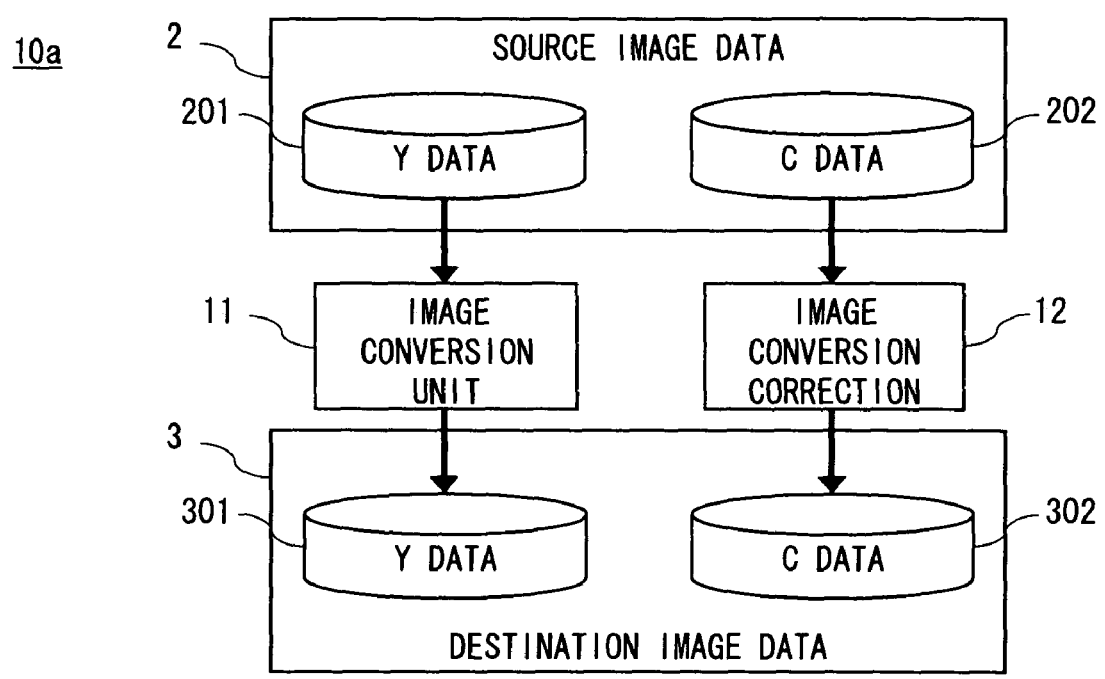
FIG. 2 is a block diagram showing the configuration of an image processing apparatus according to a first example of the present invention.

FIG. 2 is a block diagram showing the configuration of the image processing apparatus 10a according to the first example of the present invention. The image processing apparatus 10a is a modified example of the image processing apparatus 10, and includes an image conversion unit 11 and an image conversion correction unit 12. The image conversion unit 11 receives an input of Y data 201, which is included in the source image data 2, to perform scaling processing on the Y data 201, and outputs Y data 301 as the destination image data 3. Note that the image conversion unit 90a described above may be applied to the image conversion unit 11. Additionally, the image conversion correction unit 12 receives an input of C data 202, which is included in the source image data 2, to perform scaling processing on the C data 202, and outputs C data 302 as the destination image data 3. In this case, the image conversion correction unit 12 performs scaling processing on the C data included in an area specified in advance, by applying the corrected scale factor, unlike in the case of the Y data included in the corresponding area.

Figure 3:
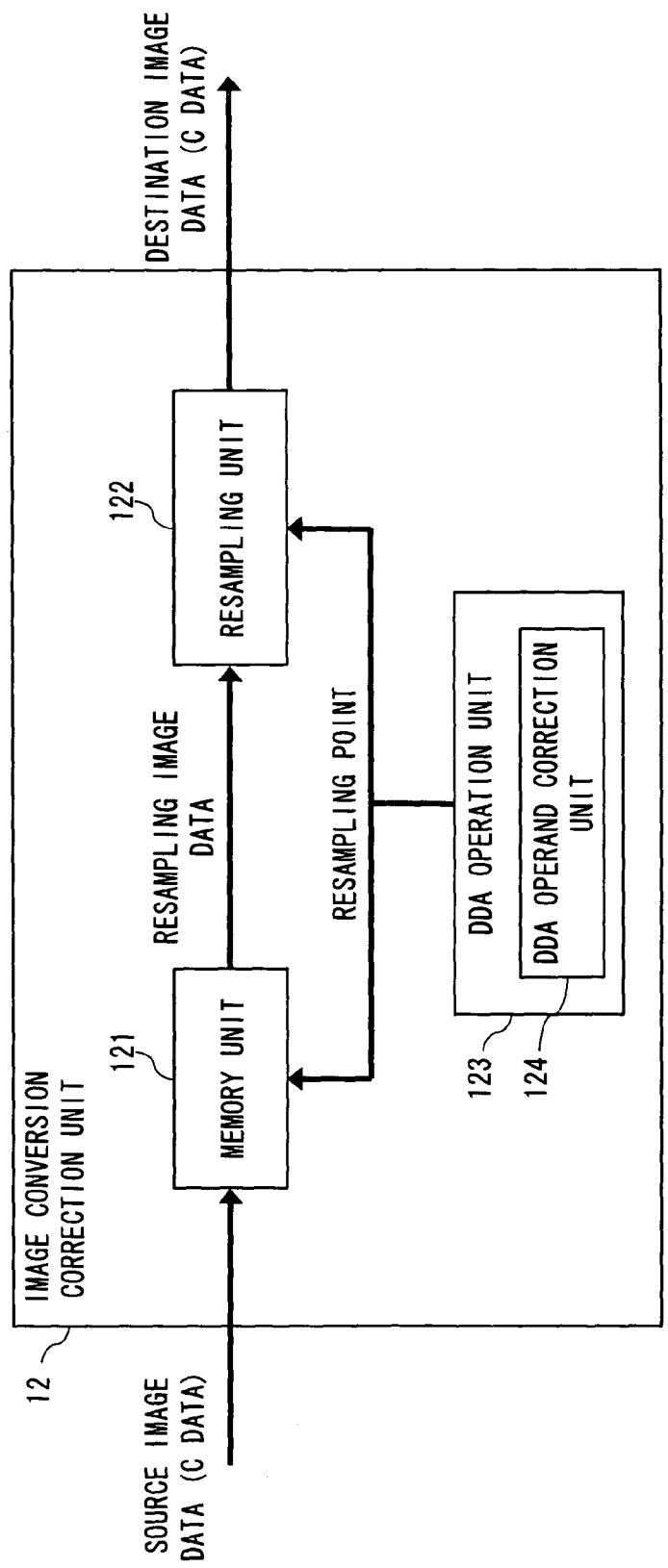
FIG. 3 is a block diagram showing the configuration of an image conversion correction unit according to the first example of the present invention.

FIG. 3 is a block diagram showing the configuration of the image conversion correction unit 12 according to the first example of the present invention. The image conversion correction unit 12 includes a memory unit 121, a resampling unit 122, and a DDA operation unit 123. The memory unit 121 receives an input of the C data, which is the source image data to be subjected to scaling processing, and stores the data. The memory unit 121 may be a memory such as a RAM (Random Access Memory), a ROM (Read Only Memory), or a non-volatile memory. The resampling unit 122 obtains, from the memory unit 121, image data corresponding to the resampling point received from the DDA operation unit 123 to perform scaling processing on the obtained image data to fit the area of the predetermined destination image data, and then outputs the destination image data. Note that the memory unit 121 and the resampling unit 122 may be similar to the memory unit 91 and the resampling unit 92 shown in FIG. 10.

Figure 10:
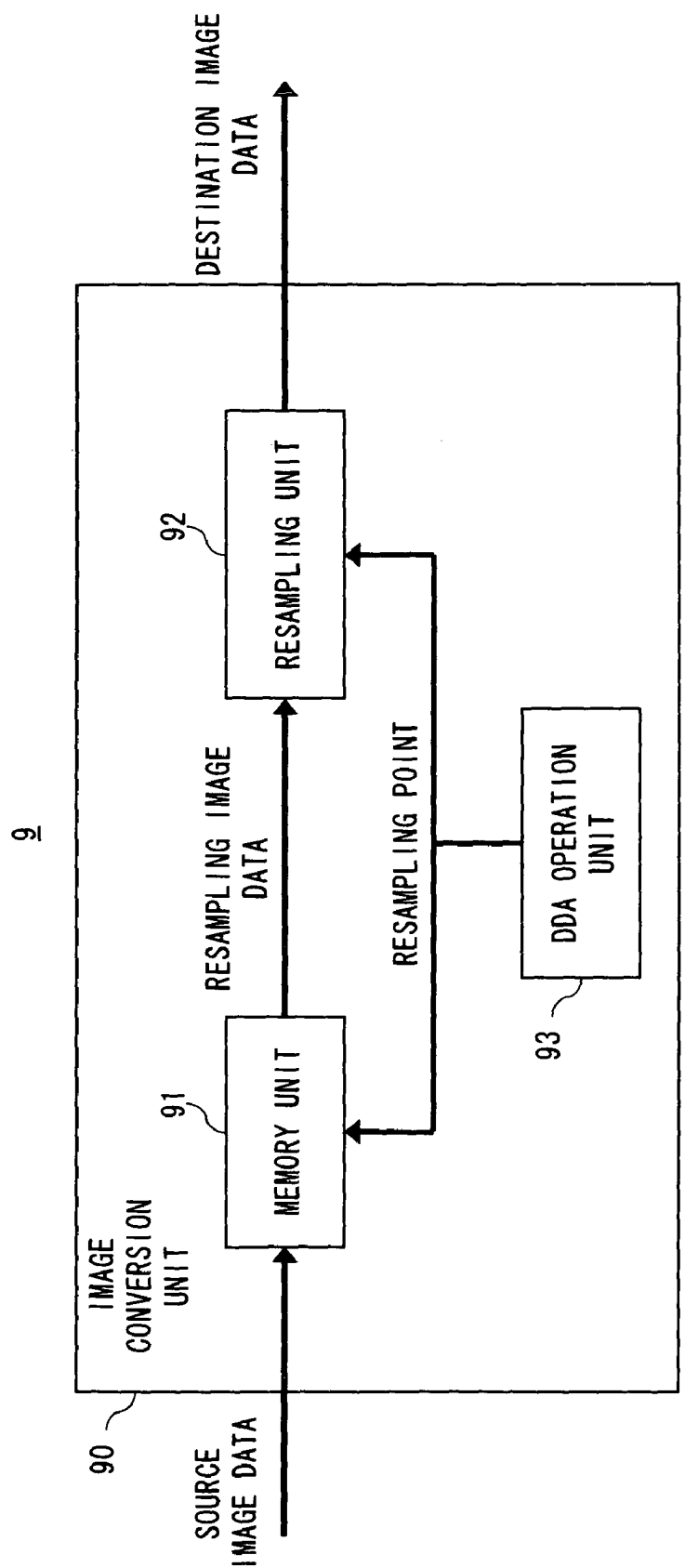
FIG. 10 is a block diagram showing the configuration of an image processing apparatus of the related art.

The DDA operation unit 123 includes a DDA operand correction unit 124 in addition to the function of the DDA operation unit 93 shown in FIG. 10. The DDA operand correction unit 124 corrects Delta, Delta2, and Delta3, which are the DDA operands, immediately before the switching of the order of the linear function, quadric function, and cubic function operation processing. Thus, the DDA operation unit 123 can calculate the resampling point using the corrected DDA operands after the switching of the order.

Figure 4:
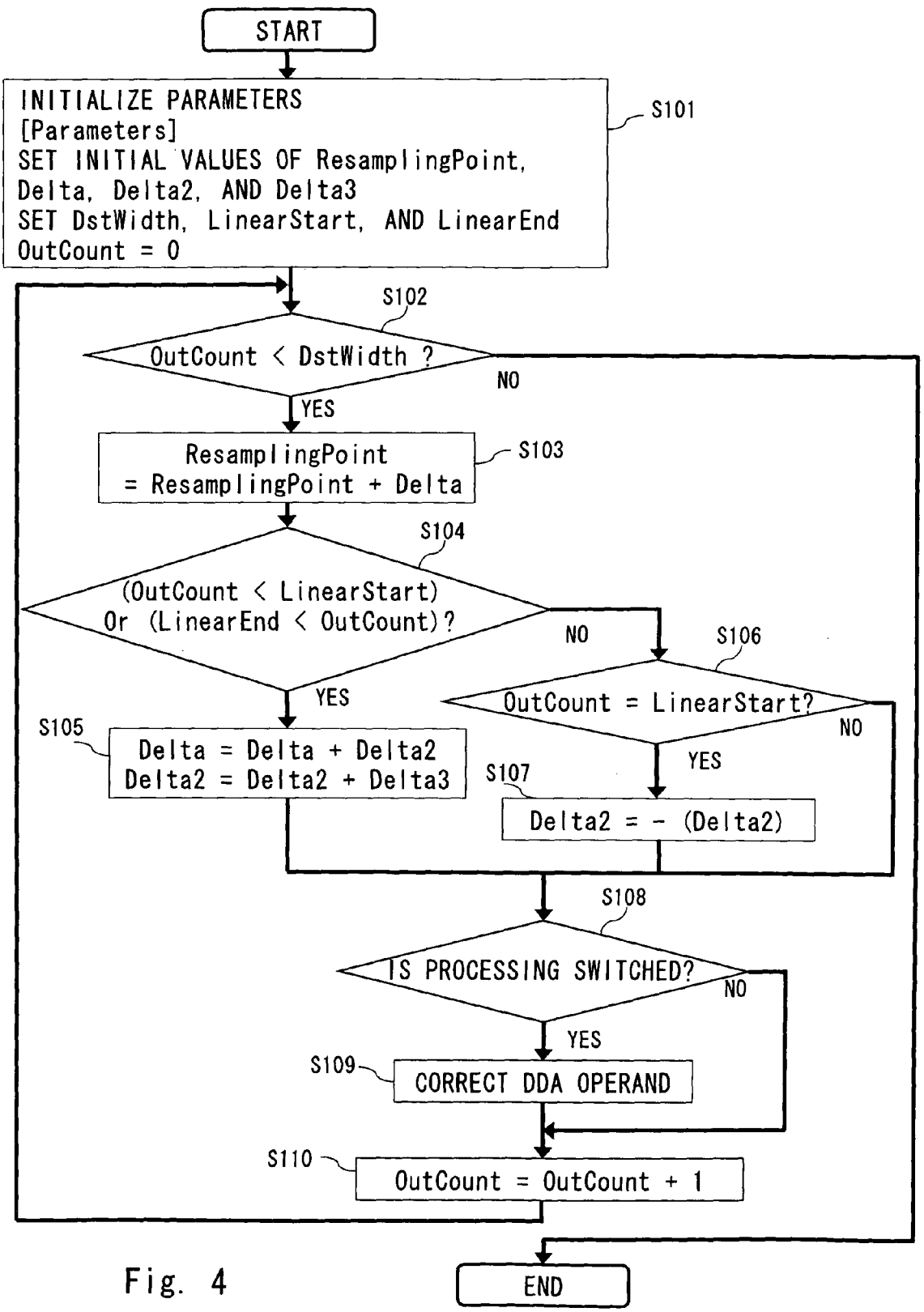
FIG. 4 is a flowchart showing processing for calculating resampling points according to the first example of the present invention.
Figure 11:
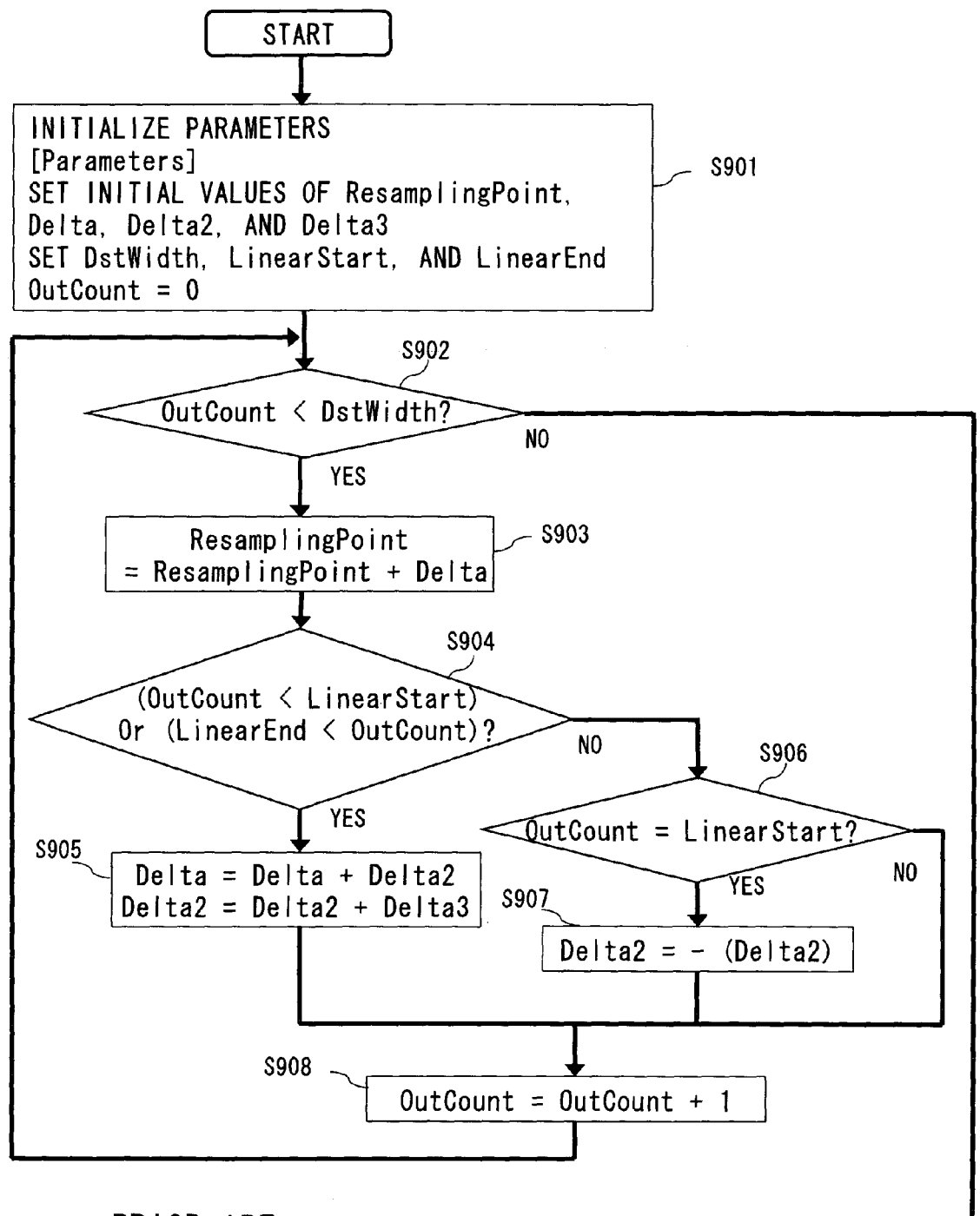
FIG. 11 is a flowchart showing processing for calculating resampling points of the related art.
Figure 12A:
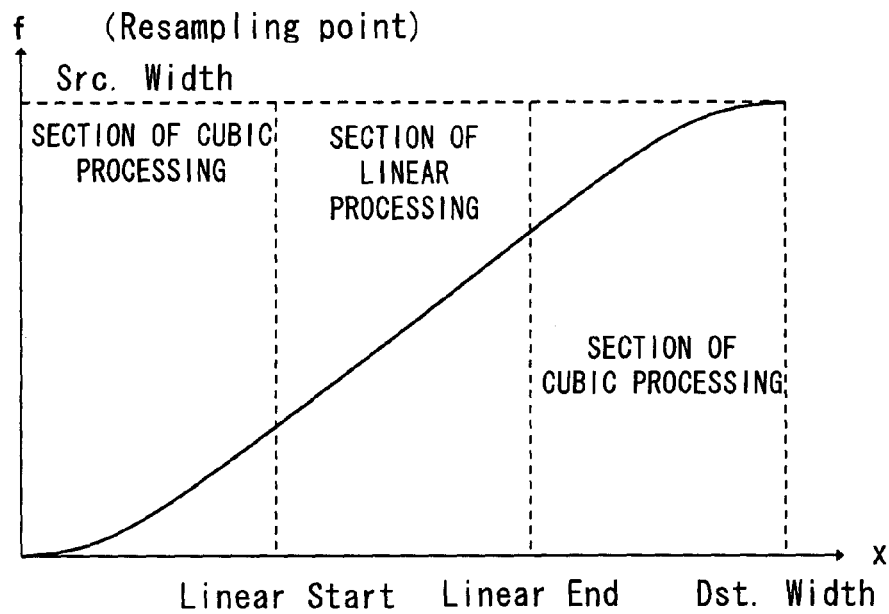
FIG. 12A is a graph showing changes in resampling points serving as DDA operands corresponding to output pixels in the related art.
Figure 12B:
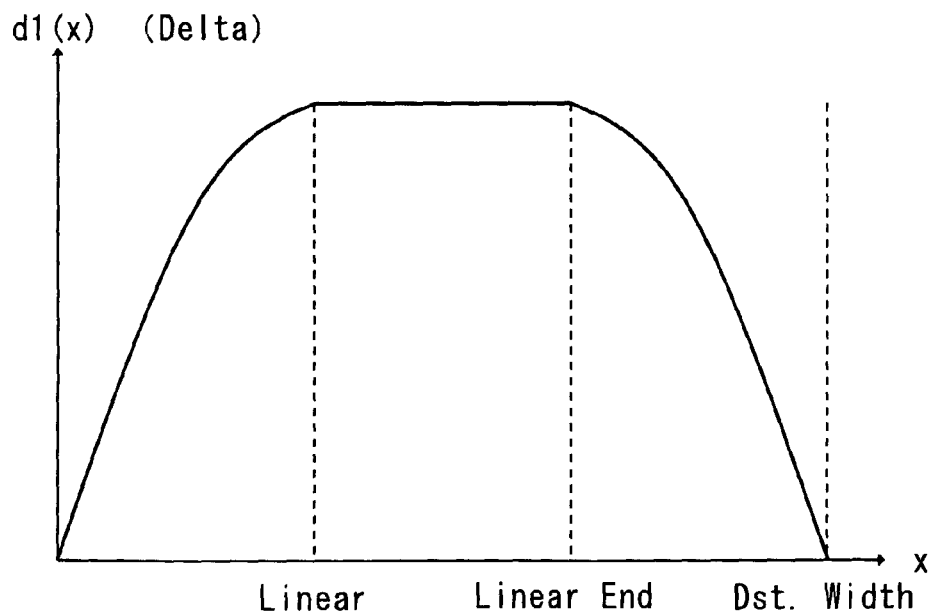
FIG. 12B is a graph showing changes in Delta serving as DDA operands corresponding to output pixels in the related art.
Figure 12C:
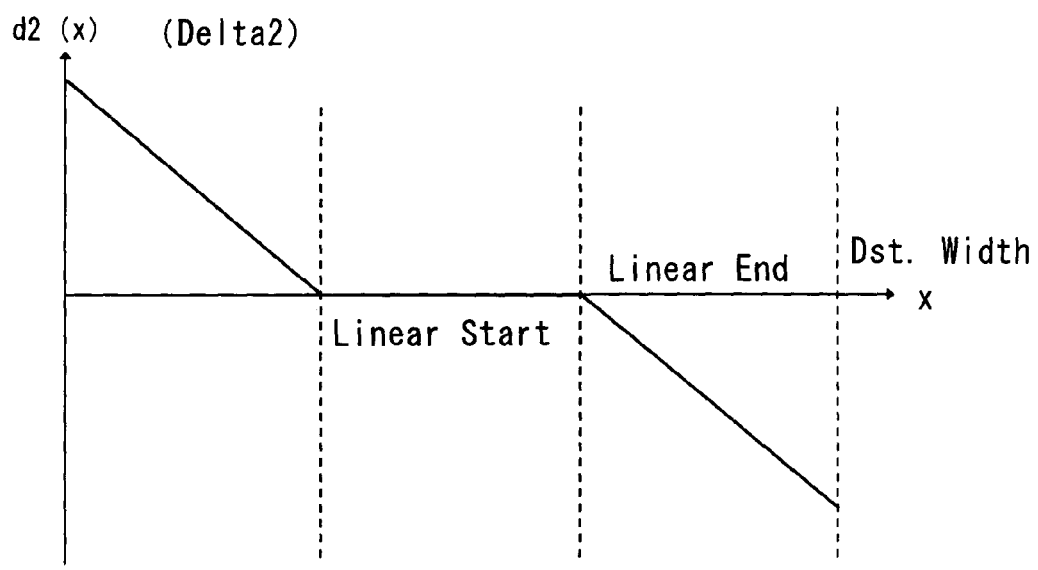
FIG. 12C is a graph showing changes in Delta2 serving as DDA operands corresponding to output pixels in the related art.
Figure 13:
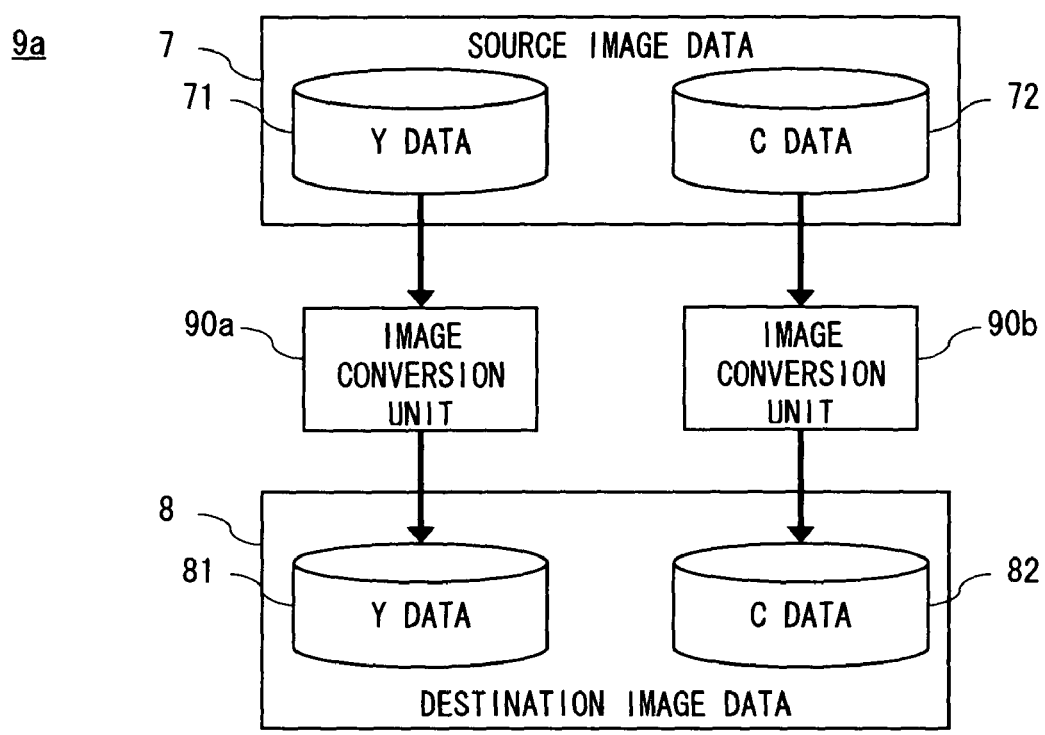
FIG. 13 is a block diagram showing a configuration example of an apparatus for performing scaling processing on image data in YCbCr 4:2:2 format by applying the related art.

FIG. 4 is a flowchart showing processing for calculating resampling points in the image conversion correction unit 12 according to the first example of the present invention. Note that Steps S101 to S107 and Step S110 of FIG. 4 are similar to Steps S901 to S908 of FIG. 11. Accordingly, a detailed description thereof is omitted and the difference from the processing shown in FIG. 11 is mainly described below.

The DDA operation unit 123 determines whether the processing is switched or not in Step S108. Specifically, the DDA operation unit 123 determines whether OutCount is a predetermined value indicating that the processing is switched. For example, the value corresponds to a position of the destination image obtained when the processing is switched from the cubic processing corresponding to the non-linear scaling to the linear processing corresponding to the linear scaling.

When determining that the processing is switched, the DDA operand correction unit 124 corrects the DDA operand (S109). In this case, the DDA operation unit 123 outputs Delta, Delta2, and Delta3, which are the DDA operands, to the DDA operand correction unit 124. Then, the DDA operand correction unit 124 adds a preset correction value to the DDA operand in accordance with the switching of the processing among Delta, Delta2, and Delta3, thereby calculating the corrected DDA operand. For example, upon switching from the cubic processing to the linear processing, the DDA operand correction unit 124 adds a correction value of Delta to Delta. Then, the value of the corrected Delta is output to the DDA operation unit 123. As a result, the DDA operation unit 123 can use the value of the corrected Delta to calculate the subsequent resampling point.

In other words, the DDA operand correction unit 124 adds a correction value to the DDA operand of the C data, at a point at which the order of the DDA operation processing is switched, for example, at a point at which the processing is switched from the cubic processing to the linear processing, so that the resampling position of the Y data is prevented from deviating from the resampling position of the C data in the DDA operation prior to the switching of the order.

As a specific example, when the processing is switched from the cubic processing to the linear processing, the correction value can be obtained as described below by comparison between the relational expressions (20) and (21) and the relational expressions (37) and (38).

A comparison between the relational expressions (21) and (38) of Delta shows that Delta of the C data is greater by ½d2y(2n). However, in order to process the Y data and C data independently of each other, the relational expressions are not used as they are. Instead, the Y data and the C data are processed independently of each other by using the transformation of the following expressions. The following relational expression (39) is derived from the relational expression (22).

$$d2_y(2n) = \frac{1}{2}d2_c(n) - \gamma \tag{39}$$

Additionally, the following relational expression (40) is derived from the relational expression (3).

$$d2_c(n) = d2_c(n-1) + d3_c(n-1) = d2_c(n-1) + 4\gamma \tag{40}$$

Then, the relational expression (40) is substituted into the relational expression (39), thereby obtaining the following relational expression (41).

$$d2_y(2n) = \frac{1}{2}d2_c(n-1) + \gamma \tag{41}$$

Accordingly, the correction value of Delta can be expressed as a correction value (42).

$$-\frac{1}{2}d2_y(2n) = -\frac{1}{4}d2_c(n-1) - \frac{1}{2}\gamma \tag{42}$$

Since the correction value can be expressed by only the DDA operand of the C data and the constant, it can be said that the Y data and C data can be processed independently of each other.

Consequently, when the processing is switched from the cubic processing to the linear processing, the DDA operand correction unit 124 adds the correction value (42) to Delta, thereby enabling correction of Delta.

As described above, according to an exemplary embodiment of the present invention, the correction value can be calculated based on a difference between the relational expressions. The DDA operand correction unit 124 adds an appropriate correction value to the DDA operand at a timing when the processing is switched, thereby enabling the non-linear scaling which prevents the resampling positions from deviating from each other in the YCbCr 4:2:2 format.

Next, a specific correction value is calculated using the correction value (42) upon switching from the cubic processing to the linear processing. In this case, assuming n=LS/2 and γ=c, the correction value can be calculated as a correction value (43).

$$-\frac{1}{4}d2_c(LS/2 - 1) - \frac{1}{2}\gamma = -\frac{1}{4}(2b + 2c) - \frac{1}{2}c \tag{43}$$
$$= -\frac{1}{2}b - c$$
$$= -0.5b - c$$

FIG. 5 is a diagram showing an algorithm and changes in values upon switching from the cubic processing to the linear processing in the first example of the present invention. FIG. 5 shows the case where the DDA processing is performed when the "Dst. Data No." is in the range from "LS−2" to "LS+2", in a similar manner as in FIG. 15. Further, the Y data is processed by the image conversion unit 11, and the C data is processed by the image conversion correction unit 12. Note that Steps S51 to S55 for the Y data shown in FIG. 5 are similar to Steps S151 to S155 of FIG. 15. Accordingly, the detailed description thereof is omitted and only the difference from the processing shown in FIG. 15, that is, the process for the C data is mainly described below.

First, in Step S51, "Dst. Data No." of the C data indicates "LS/201", and the DDA operation unit 123 performs addition of the resampling point, Delta, and Delta2, by the processing corresponding to Steps S103 and S105 of FIG. 4. Additionally, in Step S108, the DDA operation unit 123 determines that "LS/2−1" is the last "Dst. Data No." of the cubic processing on the C data and that the order is ready to be switched. Then, in Step S109 of FIG. 4, the DDA operand correction unit 124 adds the correction value (43) to Delta. Specifically, Delta serving as an input value of the C data when "Dst. Data No." shown in FIG. 5 indicates "LS/2" is represented by a+2b+c.

Next, in Step S53, "Dst. Data No." of the C data indicates "LS/2", and the DDA operation unit 123 adds Delta, which is corrected in Step S51, to the resampling point, by the processing corresponding to Step S103 of FIG. 4. Further, since "LS/2" corresponds to the linear processing section, the DDA operation unit 123 determines "NO" in Step S104 of FIG. 4, and does not perform addition of Delta and Delta2.

In this manner, Delta of the C data is corrected at a boundary between the cubic processing and the linear processing, thereby satisfying the relational expressions (37) and (38) for the Y data and C data also in Step S55. In other words, when the correction is performed in this manner, the color shift can be eliminated as shown in FIG. 6.

Figure 14:
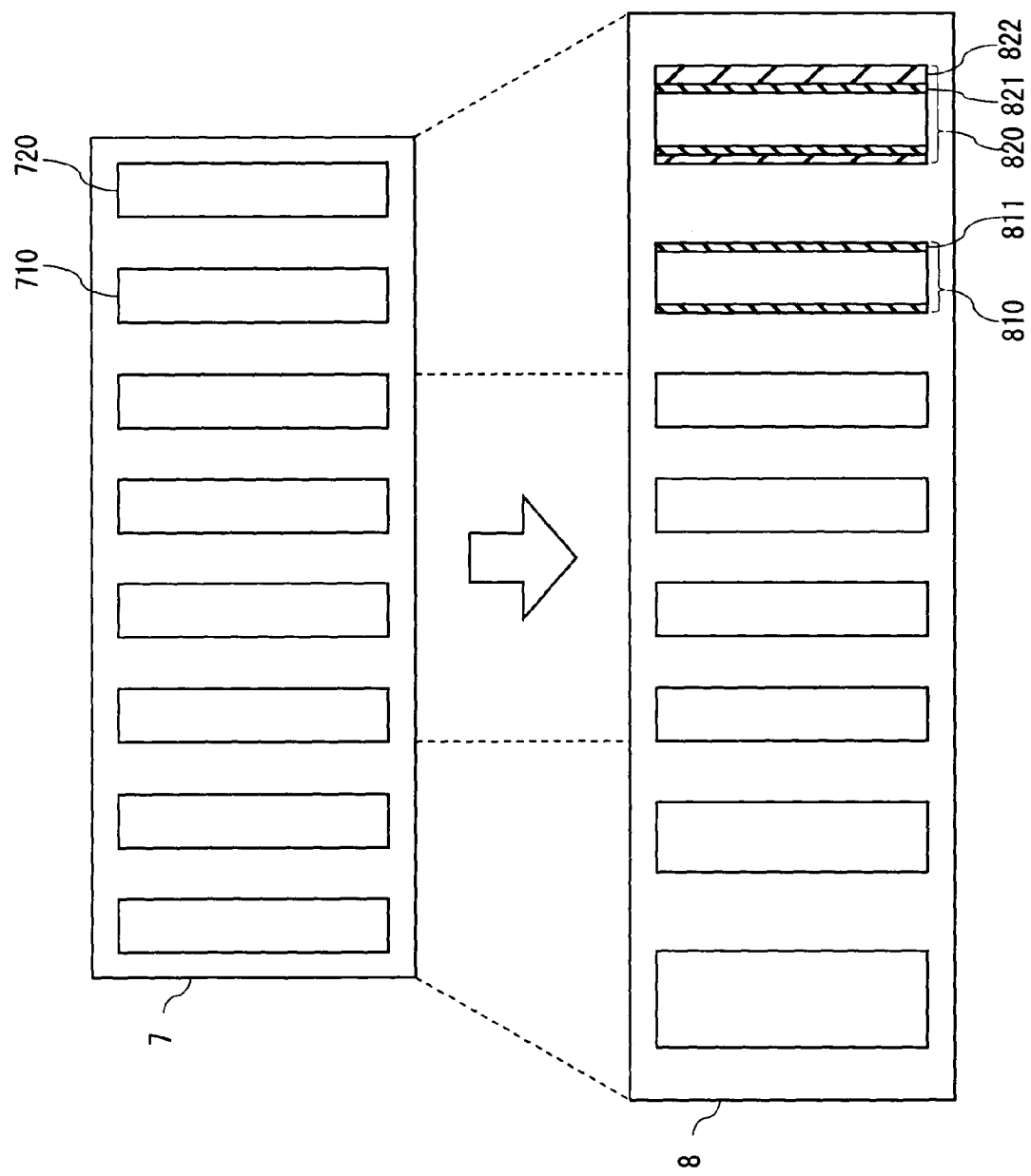
FIG. 14 is a schematic diagram showing an outline of the results of scaling processing for image data in the related art.

FIG. 6 is schematic diagram showing an outline of the results of the scaling processing for image data in the first example of the present invention. It is assumed in FIG. 6 that the source image data 2 includes a colored area 210 and a colored area 220, and the colored area 210 and the colored area 220 are represented by Y data and C data, respectively. Further, the destination image data 3, which is data obtained after the scaling processing performed by the image processing apparatus 10a, includes a colored area 310 and a colored area 320. In this case, unlike in the colored area 810 and the colored area 820 of FIG. 14, no color shift occurs in the colored area 310 and the colored area 320.

According to the first example of the present invention, it is possible to eliminate the color shift that occurs upon switching between the non-linear scaling processing and the linear scaling processing.

In other words, the DDA operand correction unit 124 described above corrects the C data, which is a signal having a low data rate, based on a difference between the relational expression (21) for calculating a value based on Delta in the cubic processing, which is the first scale factor, and the relational expression (38) for calculating a value based on Delta in the linear processing, which is the second scale factor.

Likewise, the DDA operand correction unit 124 performs correction based on a difference between the relational expression (38) and the relational expression (21) upon switching of the order from the linear processing to the cubic processing.

In other words, the DDA operand correction unit 124 described above performs correction when the order of the relational expression (38) for calculating a value based on Delta in the linear processing, which is the second scale factor, changes relative to the order of the relational expression (21) for calculating a value based on Delta in the cubic processing, which is the first scale factor.

EXAMPLE 2

An image processing apparatus that corrects DDA operands when the scaling processing is switched from the quadratic processing to the cubic processing will be described below as a second example of the image processing apparatus 10 according to the first exemplary embodiment of the present invention. Note that the configuration of the image processing apparatus according to the second example is similar to that of FIG. 3, so illustration and description thereof are omitted.

In the case of switching the scaling processing from the quadratic processing to the cubic processing, the correction value at the time of switching the scaling processing to the cubic processing is expressed as "2γ" with respect to Delta2, by comparison between the relational expressions (30) to (32) and the relational expressions (20) to (22). Then, the specific correction value is calculated using the correction value "2γ". Since the quadratic processing is carried out in this case, γ=c (constant) is satisfied, and the specific correction value is "2c".

Figure 7:
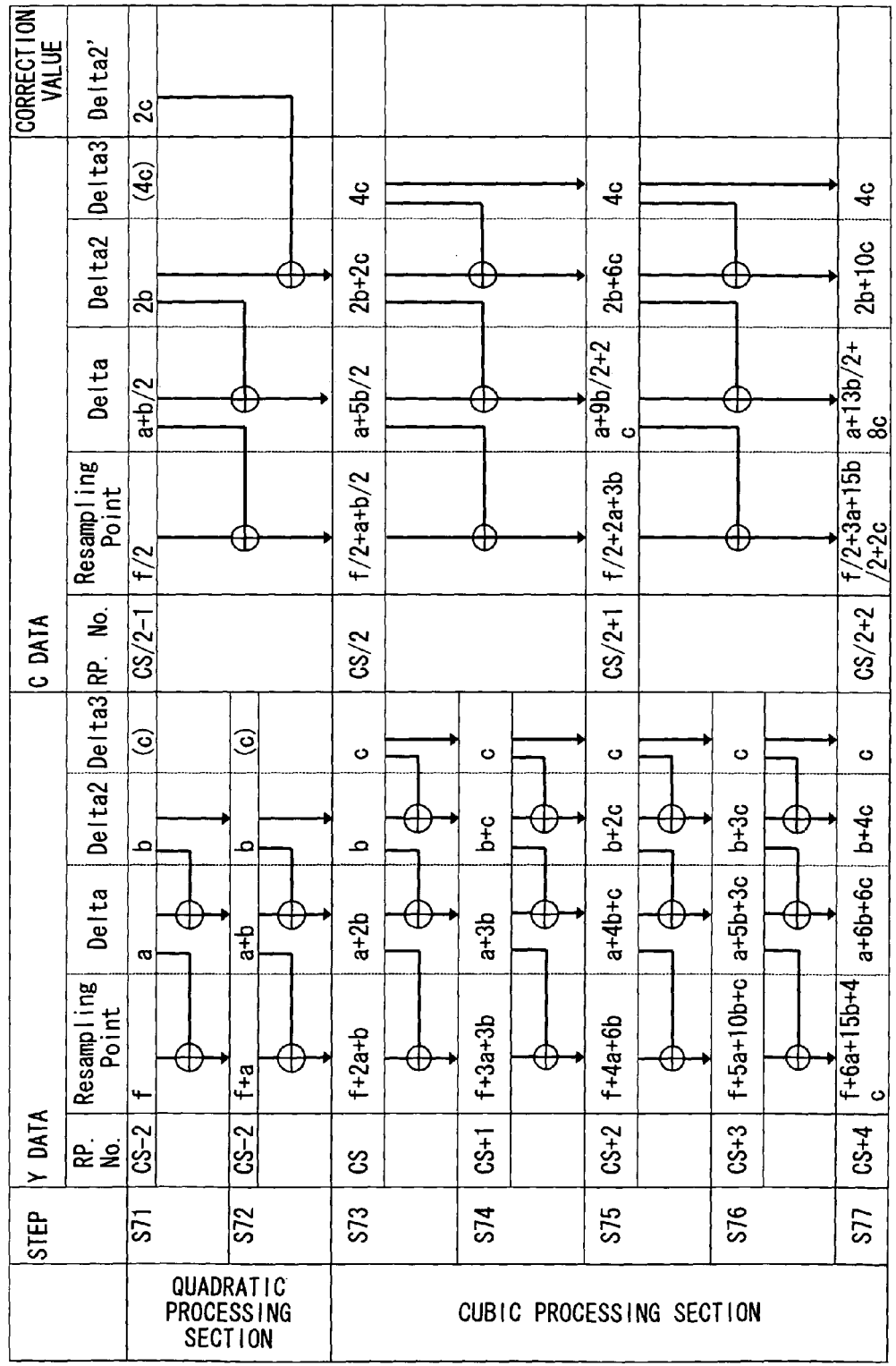
FIG. 7 is a diagram showing an algorithm and changes in values upon switching from quadratic processing to cubic processing in a second example of the present invention.

FIG. 7 is a diagram showing an algorithm and changes in values upon switching from the quadratic processing to the cubic processing in the second example of the present invention. In FIG. 7, "RP. No." of each of the Y data and C data represents the number of resampling points. Additionally, "CS" of "RP. No." represents the number of resampling points at the time of starting the cubic processing for the Y data. FIG. 7 shows a case where the DDA processing is carried out when "RP. No." is in a range from "CS−2" to "CS+4".

Herein, "RP No." defines the DDA operand of the C data with the DDA operand in "CS−2", which is two steps before "CS" with respect to the Y data, as a reference. In other words, the DDA operand of the C data can be calculated by the relational expressions (30) to (32) which are relational expressions for the quadratic processing.

Specifically, when "RP. No." of the Y data indicates "CS−2" in Step S71 of FIG. 7, the resampling point is defined as "f"; Delta is defined as "a"; Delta2 is defined as "b"; and Delta3 is defined as "c". Further, when "RP. No." of the C data indicates "CS/2−1", the resampling point is defined as "f/2"; Delta is defined as "a+b/2"; Delta2 is defined as "2b"; and Delta3 is defined as "4c". Note that Delta3 is not used in a quadratic processing section.

The processing flow is described below. A detailed description of the same processing as that of FIG. 5 is omitted, and only the difference from the processing shown in FIG. 5 is mainly described below. Referring first to FIG. 7, in Steps S71 and S72, the quadratic processing is performed on both the Y data and C data. Further, in Steps S73 to S77, the cubic processing is performed on both the Y data and C data.

In this case, regarding the C data, when the processing is switched from the quadratic processing to the cubic processing, that is, when OutCount corresponds to "CS/2−1" in Step S108 of FIG. 4, the DDA operation unit 123 determines "YES". Then, the DDA operand correction unit 124 adds the correction value "2c" of Delta2 to Delta2, and outputs the value of the corrected Delta2 to the DDA operation unit 123. Specifically, Delta2 serving as the input value of the C data when "RP. No." of FIG. 7 indicates "CS/2" is represented by 2a+2b. Hereinafter, the cubic processing is carried out in Steps S75 and S77 in a similar manner as in the Y data.

As shown in FIG. 7, the relational expressions (20) to (23) are always satisfied in the cubic processing section, with the result that no color shift occurs. This is because the relational expressions (20) to (23) are satisfied in Step S73 when Delta2 is corrected in Step S71 and used as the input value in Step S73.

According to the second example of the present invention, the color shift that occurs upon switching of the order between the non-linear scaling processings can be eliminated.

In other words, the DDA operand correction unit 124 described above corrects the C data, which is a signal having a low data rate, based on a difference between the expression (32) for calculating the difference Delta2 based on the relational expression (31) for calculating a value based on Delta in the quadratic processing, which is the first scale factor, and the expression (22) for calculating the difference Delta2 based on the relational expression (21) for calculating a value based on Delta in the cubic processing, which is the second scale factor.

EXAMPLE 3

An image processing apparatus that corrects DDA operands when the scaling processing is switched from the quadratic processing to the linear processing will be described below as a third example of the image processing apparatus 10 according to the first exemplary embodiment of the present invention. Note that the configuration of the image processing apparatus according to the third example is similar to that of FIG. 3, so illustration and description thereof are omitted.

In the case of switching the scaling processing from the quadratic processing to the linear processing, the correction value at the time of switching the scaling processing to the linear processing is expressed as $-(1/2)d2y(2n)$ with respect to Delta, by comparison between the relational expression (31) the relational expression (38). Then, the correction value $-(1/2)d2y(2n)$ is substituted into the relational expression (26) to calculate a specific correction value. Since $\beta=\beta_2$ (constant) is satisfied in this case, the specific correction value can be expressed by the following relational expression (44).

$$-\frac{1}{2}d2_y(2n) = -\frac{1}{2}\beta_2 \tag{44}$$

Thus, the correction value $-(1/2)b$ of Delta is obtained from the relational expression (44).

FIG. 8 is a diagram showing an algorithm and changes in values upon switching from the quadratic processing to the linear processing in the third example of the present invention. FIG. 8 shows the case where the DDA processing is carried out when "Dst. Data No." is in the range from "LS−2" to "LS+2", in a similar manner as in FIG. 5.

Herein, "Dst. Data No." defines the DDA operand of the C data with the DDA operand in "LS−2", which is two steps before "LS" with respect to the Y data, as a reference. In other words, the DDA operands of the C data can be calculated by the relational expressions (30) to (32), which are relational expressions for the quadratic processing, in a similar manner as in FIG. 7 described above. The specific values in Step S81 of FIG. 8 are values obtained by replacing "CS" by "LS" of FIG. 7, so the description thereof is omitted.

The processing flow is described below. A detailed description of the same processing as that shown in FIG. 5 is omitted, and the difference from the processing shown in FIG. 5 is mainly described below. First, in Steps S81 and S82 of FIG. 8, the quadratic processing is performed on both the Y data and C data. Further, in Steps S83 to S85, the linear processing is performed on both the Y data and C data.

In this case, regarding the C data, when the processing is switched from the quadratic processing to the linear processing, that is, when OutCount corresponds to "LS/2−1" in Step S108 of FIG. 4, the DDA operation unit 123 determines "YES". Then, the DDA operand correction unit 124 adds the correction value $-(1/2)b$ of Delta to Delta, and outputs the value of the corrected Delta to the DDA operation unit 123. Specifically, Delta serving as the input value of the C data when "Dst. Data No." of FIG. 8 indicates "LS/2" is represented by a+2b. Hereinafter, the linear processing is carried out in Step S85 in a similar manner as in the Y data.

As shown in FIG. 8, since the relational expressions (37) and (38) are satisfied in the linear processing section, it can be said that the resampling positions of the Y data and C data are always the same.

According to the third example of the present invention, the color shift that occurs upon switching between the non-linear scaling processing and the linear scaling processing of the quadratic processing can be eliminated.

[Other Exemplary Embodiments]

As described in the first to third examples of the present invention, the appropriate correction value is added to the DDA operands in the case of switching processing of the DDA operation, thereby making it possible to set the resampling positions of the Y data and C data to be always the same. FIG. 9 shows a table indicating correction values used at the time when the linear processing, quadratic processing, and cubic processing are mutually switched according to an exemplary embodiment of the present invention. For example, upon switching from the cubic processing to the quadratic processing, the correction can be achieved by adding a correction value "−2γ" to Delta2.

Note that the problem that the color shift occurs in the YCbCr 4:2:2 format can be solved by performing scaling processing after upsampling to the YCbCr 4:4:4 format as disclosed in Japanese Unexamined Patent Application Publication No. 2007-74526. Meanwhile, according to an exemplary embodiment of the present invention, the amount of the C data is a half of that in the case of performing upsampling, thereby attaining an effect of saving memories and reducing the size of a scaling circuit. Furthermore, according to an exemplary embodiment of the present invention, the amount of the C data is reduced to a half also in the image processing subsequent to the scaling processing, thereby attaining an effect of reducing the circuit size of the whole image processing system.

Furthermore, the present invention is not limited to the above exemplary embodiments, and various modifications can be made without departing from the above-mentioned scope of the present invention.

The first and other exemplary embodiments can be combined as desirable by one of ordinary skill in the art. Alternatively, the first, second, and third examples can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An image processing apparatus that performs scaling processing on image data including a plurality of signals having different data rates, comprising:

a first scaling processing unit that performs a first scaling processing according to a first scale factor in a first area; and a second scaling processing unit that performs a second scaling processing subsequent to the first scaling processing, according to a second scale factor in a second area adjacent to the first area, wherein the second scaling processing unit performs the second scaling processing on a signal having a high data rate with use of the first scale factor, upon start of the second scaling processing, and performs the second scaling processing on a signal having a low data rate with use of the second scale factor obtained by correcting the first scale factor.

2. The image processing apparatus according to claim 1, wherein the first scaling processing unit calculates the second scale factor for the signal having the low data rate, by correcting the first scale factor so that the second scale factor becomes a value obtained by performing the second scaling processing on the first scale factor.

3. The image processing apparatus according to claim 1, wherein the first scaling processing unit corrects the signal having the low data rate, based on a difference between a first relational expression for calculating a value based on the first scale factor and a second relational expression for calculating a value based on the second scale factor.

4. The image processing apparatus according to claim 3, wherein the first scaling processing unit corrects the signal having the low data rate, based on a difference between an expression for calculating a difference based on the first relational expression and an expression for calculating a difference based on the second relational expression.

5. The image processing apparatus according to claim 1, wherein the first scaling processing unit performs correction when an order of a second relational expression for calculating a value based on the second scale factor changes relative to an order of a first relational expression for calculating a value based on the first scale factor.

6. The image processing apparatus according to claim 1, wherein:
the signal having the high data rate comprises a luminance signal; and
the signal having the low data rate comprises a color-difference signal indicating a difference in color from the luminance signal.

7. The image processing apparatus according to claim 1, wherein the data rate is based on YCbCr 4:2:2 format.

8. An image processing method that performs scaling processing on image data including a plurality of signals having different data rates, the image processing method comprising:
performing a first scaling processing according to a first scale factor in a first area; and
performing a second scaling processing subsequent to the first scaling processing, according to a second scale factor in a second area adjacent to the first area, performing the second scaling processing on a signal having a high data rate with use of the first scale factor, upon start of the second scaling processing, and performing the second scaling processing on a signal having a low data rate with use of the second scale factor obtained by correcting the first scale factor.

9. The image processing method according to claim 8, wherein, in the first scaling processing, the second scale factor is calculated for the signal having the low data rate by correcting the first scale factor so that the second scale factor becomes a value obtained by performing the second scaling processing on the first scale factor.

10. The image processing method according to claim 8, wherein, in the first scaling processing, the signal having the low data rate is corrected based on a difference between a first relational expression for calculating a value based on the first scale factor and a second relational expression for calculating a value based on the second scale factor.

11. The image processing method according to claim 10, wherein, in the first scaling processing, the signal having the low data rate is corrected based on a difference between an expression for calculating a difference based on the first relational expression and an expression for calculating a difference based on the second relational expression.

12. The image processing method according to claim 8, wherein, in the first scaling processing, correction is performed when an order of a second relational expression for calculating a value based on the second scale factor changes relative to an order of a first relational expression for calculating a value based on the first scale factor.

13. The image processing method according to claim 8, wherein:
the signal having the high data rate comprises a luminance signal; and
the signal having the low data rate comprises a color-difference signal indicating a difference in color from the luminance signal.

14. The image processing method according to claim 8, wherein the data rate is based on YCbCr 4:2:2 format.

* * * * *